Dec. 6, 1955   J. HALTENBERGER   2,725,605
AUTOMOBILE GLASS DEFROSTING AND DRYING
Filed April 24, 1950   2 Sheets-Sheet 1

Inventor
Jules Haltenberger

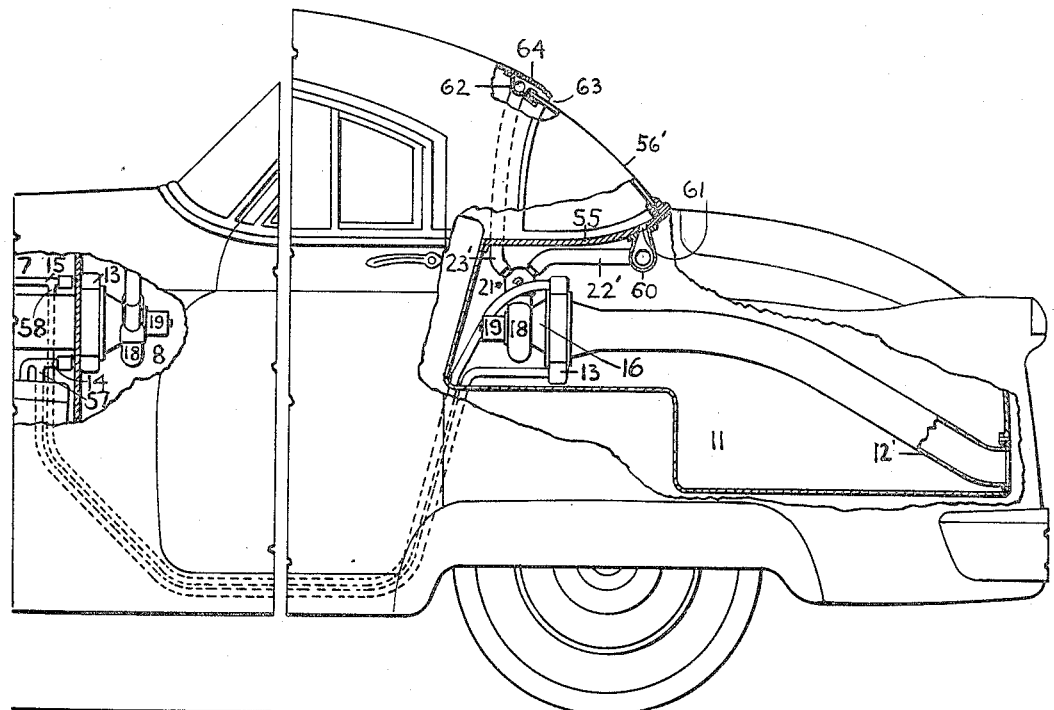
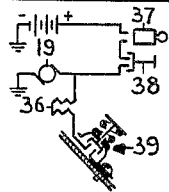
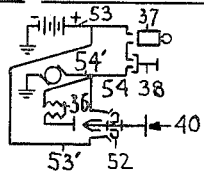
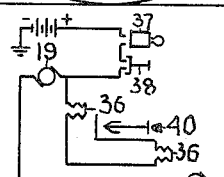
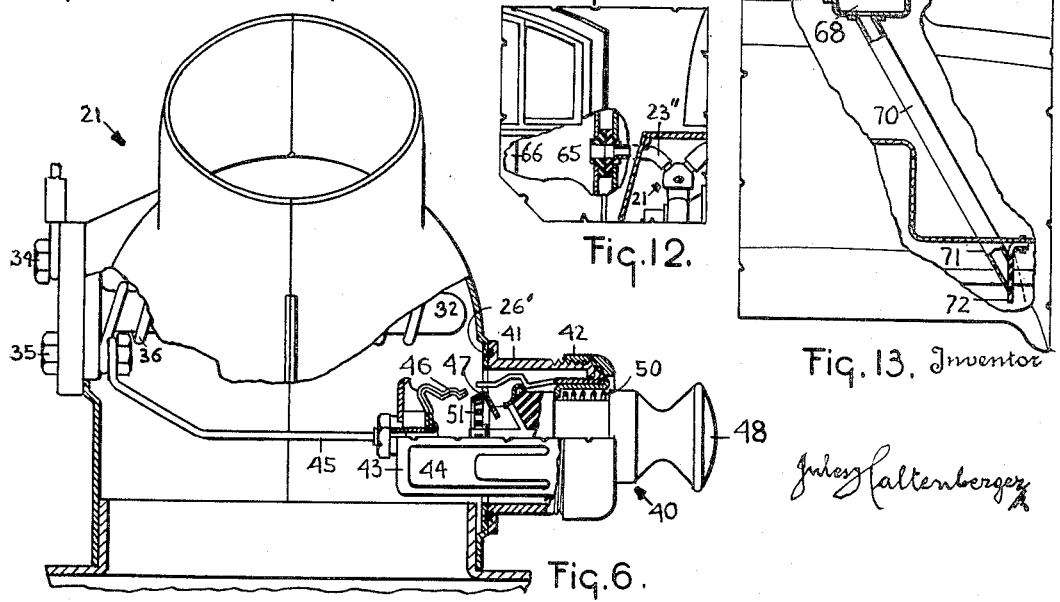

United States Patent Office 2,725,605
Patented Dec. 6, 1955

2,725,605

AUTOMOBILE GLASS DEFROSTING AND DRYING

Jules Haltenberger, Rancho Santa Fe, Calif.

Application April 24, 1950, Serial No. 157,733

10 Claims. (Cl. 20—40.5)

In the present day motor vehicles the rubber seals around each and every door are conducive to the beclouding of all glass surfaces with a vapor or dew deposit, when a change of temperature occurs in the ambient air.

It was found that the quickest dew or vapor removal is accomplished by a blast of outside and not inside air, for this purpose, the adoption of a small electric motor driven blower fan, arranged to blast or blow outside air —or after waiting until the engine is warmed up—heat exchanger warmed air on the usual windshield, is a part of a standard equipment found on all automobiles now in use, and now in production.

New automobiles are now provided with a "full view" rear window, theoretically eliminating all "blind spots," in reality, however, prevailing moisture, frost, ice, snow or dew beclouded rear window prevent the use of the enlarged windows for the purpose intended. An automobile driver will usually supervise the transparency of his windshield, however, he is not provided with means to keep the rear window in a similar condition. A glance at the rear view mirror, at a crucial moment, just to find a clouded, snow covered or frosted rear window, is the cause of many accidents.

It was proposed to blow defrosting air from a usual luggage compartment on the outer end of the inside surface of a usual rear window; now abandoned. There were proposals to blow defrosting air on the outer surface of a usual windshield; applicant is unaware of their adoption; they are not used. The normally unidirectional motion of an automobile creates a positive air impingement on the windshield, destroying the possible formation of a protective boundary layer.

It is here proposed, and is the object of my invention, to blow defrosting and drying ambient or heated air along the exterior surface of a rear window and there forming a protective moving substantially boundary layer on said surface.

A further object is to provide substantially instant windshield defrosting hot air, and make it available as an accessory for automobiles now in use.

A further object is to provide substantially instant rear window defrosting hot air, and make it available for automobiles now in use.

A further object is to clean the rear window while the windshield is being cleaned by a manual or automatic control.

Further objects will appear as the description proceeds.

Figure 1:
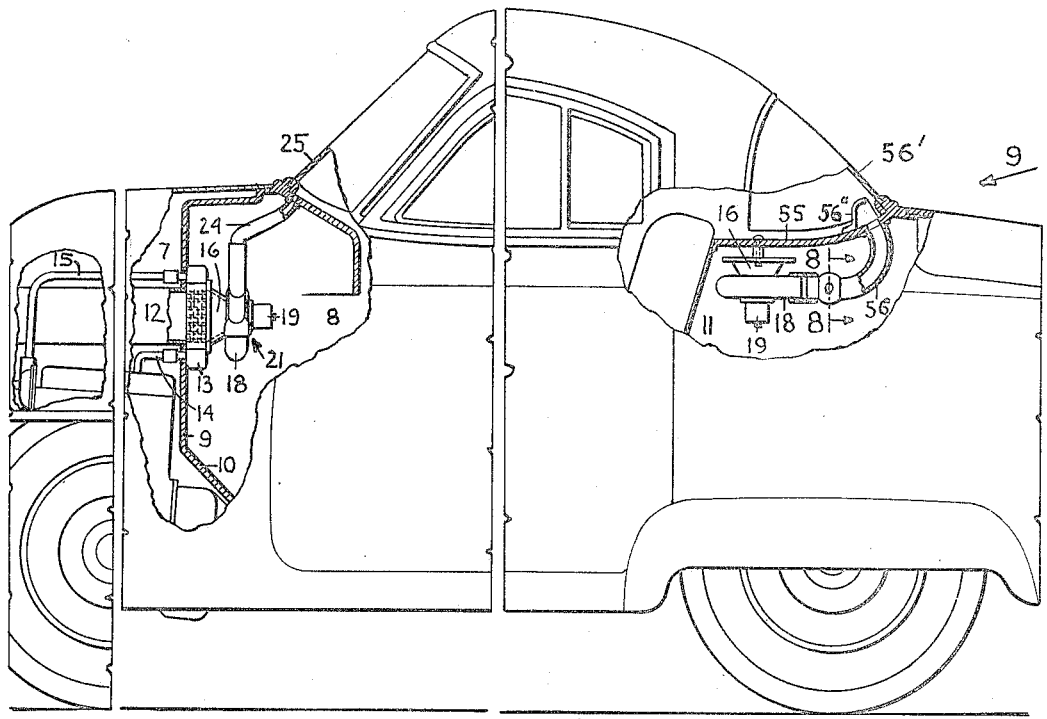
Figure 2:
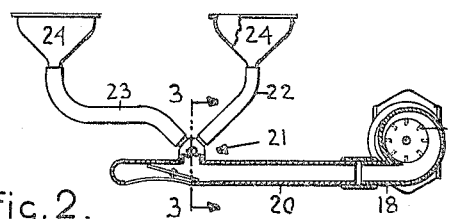
Figures 8, 9:
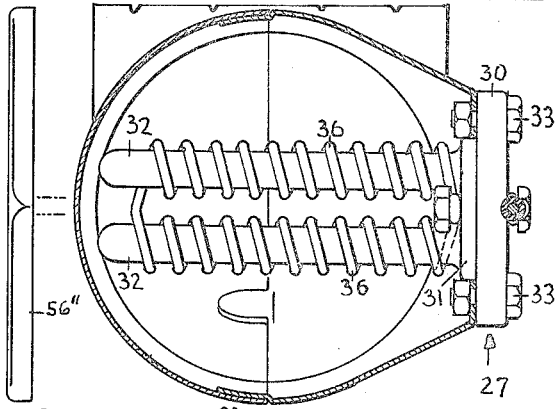
Figures 3, 4:
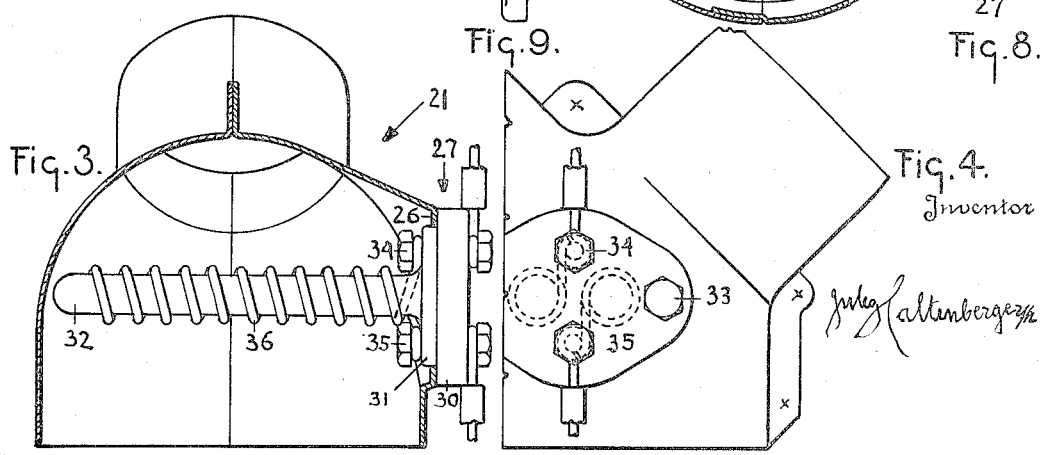

Referring to the drawings: Fig. 1 is a side elevation of an automobile with parts broken away; Fig. 2 is the defrosting system shown in Fig. 1, here as viewed from the driver's seat; Fig. 3 is a section substantially on line 3—3 of Fig. 2, here shown in a larger scale; Fig. 4 is a side elevation of Fig. 3; Fig. 5 is a wiring diagram and schematical presentation of foot operated electric grounding switch; Fig. 6 illustrates an automatic time switch (thermoelement), a substitution for the foot operated switch shown in Fig. 5; Fig. 7 is a modified wiring diagram permitting a defrosting operation while the automobile is unattended and the operation automatically terminates at the response of a thermoelement; Fig. 8 is a section substantially on line 8—8 of Fig. 1, here shown in a larger scale; Fig. 9 is a rear view of an accessory air distributor as viewed from arrow 9; Fig. 10 is a wiring diagram for the operation of the windshield and rear window defrosting and drying elements both by single controls; Fig. 11 is a side elevation of an automobile with parts broken away illustrating the defrosting and drying of a rear window, a modification of the invention; Fig. 12 is a modification of a detail shown in Fig. 11; Fig. 13 is a further modification of the invention and shall be presented in a divisional application.

Referring to Figs. 1 to 5 inclusive it will be seen that an automobile is formed of an engine compartment 7, passenger compartment 8, with a dashboard 9 and toe board 10 in between, and a luggage compartment 11. Through the dashboard a duct 12 is arranged to supply outside air through a heat exchanger or radiator 13 having a hot water inlet pipe 14 and outlet pipe 15. The air passing through the radiator and collector 16 enters into a blower fan 17 in housing 18 arranged to be driven by an electric motor 19, in the usual manner. The outlet of the housing 18 is connected to a distributing duct 20, this duct is provided with an air distributing Y generally at 21, to supply the defrosting or glass drying air through the usual flexible ducts 22 and 23 and opening connections 24 respectively, to the inner glass wall of the windshield 25, in the usual manner.

As it is clear from Figs. 3 and 4 distributing Y 21 is formed of two half stampings suitably held together by spot wielding, in the usual manner. Here, however, a flat mounting wall 26 is provided for the adoption and mounting of an electric resistance coil support, generally at 27 (also shown in plan view in Fig. 8). This support preferably of porcelain, or of a material of equal heat resisting and non-conducting character, is formed of a securing flange 30, therewith integral locating hub 31 and therefrom protruding prongs 32. Flange 30 is provided with mounting bolts 33, electric current input anchor bolt 34 and output anchor bolt 35. These anchor bolts are electrically interconnected by an air heating resistance wire coil 36, of the usual air oxidization resisting nickel chromium composition, or the like.

As schematically indicated in Fig. 5, the current is supplied through a usual conduit to a usual key operated ignition switch 37, after the ignition switch is "turned on" the current does reach the defrosting fan motor switch 38, when this switch is turned on through a usual conduit motor 19 starts to operate blower fan 17, thereby supplying a quantity of outside air to the rear face of the windshield, in the usual manner. Here, however, Y 21 being provided with an air heating resistance coil 36, upon grounding the output line of this coil as by spring loaded foot operated switch at 39, the coil energized, and heated by resistance, will instantly heat the air passing through the Y.

The heating process of an electric resistance is substantially instantaneous and reaches well over 1200 degrees F. whereas, in the present day automobiles the driver has to wait 3 to 6 precious minutes for the air, arranged to be heated by a heat exchanger of less than 212 degrees F.

Applicant here proposes a much needed device of genuine public benefit, that is inexpensive, and is applicable to automobiles now in service, in fact the illustrated Y shows a full size duplicate of the Y now used by one of the largest producers. It is important to note, that the resistance will only heat up after the air current is turned on, and with the generally used voltage regulation of a usual generator, the electric battery cannot be "starved."

When it is desired to eliminate the foot operation above described, applicant proposes the use of a thermoelement now available at little expense, this is illustrated in Fig. 6. Here, an air distributing Y generally at 21' is provided with a sliding contact grounding switch in association with a heating coil above described.

As it is clear from the drawing, applicant illustrates a well known cigarette lighter, generally at 40 as the current grounding means.

It is believed that cigarette lighters are too well known, and for simplicity of presentation only the main elements need to be described. Wall 26' is provided with a thermoelement mounting hub 41 wherein as by nut 42 the element having a closed ended cylindrical housing 43 with window 44 therein is secured, and thereby electrically grounded.

The current reaching the output anchoring bolt 35 through wire 45 is conducted to a usual three pronged (only one is shown) bi-metallic spring thermoelement 46, in contracted position (as shown) arranged to hold nose 47 of the contact creating sliding element when moved to a "set position" (not shown) by push button 48 against release coil spring 50. The current passing through spiral resistance 51 is thereby heated, consequently through radiation does heat the bi-metallic element 46, when it reaches a predetermined temperature, the three prongs 46 open outwardly, releasing the push button operated sliding element, when release coil spring 50 returns same to the broken circuit position illustrated.

Applicant here proposes the use of a well known thoroughly proven inexpensive device for a new purpose, to serve as a time switch. It is important to note, that a cigarette lighter when used for its originally intended purpose, is completely metal jacketed (not shown), to retain all generated heat, for the earliest release of the cigarette lighting heated element (approximately 10 seconds). It is applicant's intent to use the existing construction without any jacketing, and to place the element into the air stream. This location has many advantages, the thermoelement generated heat serves to heat the air for windshield defrosting, by placing the thermoelement into the air stream to a predetermined depth and allowing the air to pass through windows 44, a present day element, serviced in all gas stations, now responding in 10 seconds will without any alteration respond to a desired two minutes or over action, by mounting the thermoelement in this proposed position the time of current cutting response will vary—to a degree—in response to the temperature of the incoming air. In zero weather the element being materially cooled by zero air will allow a longer desired heating process than when operating in thirty two degrees when correspondingly less heat is needed to defrost a windshield.

When it is desired to defrost the windshield and partially heat the automobile interior without the discomfort of sitting in the automobile, is schematically illustrated in Fig. 7. Here, the thermoelement 40 is provided with an isolated circular double contact 52 when in "set position" it does by-pass motor switch 38 by conduits 53 with 53' and 54 with 54' respectively, thereby starting the air circulating motor 19 and the heating of the element 36. This defrosting process will automatically stop in response to the thermoelement action described in connection with Fig. 6.

The advantages of windshield defrosting and glass drying is equally applicable to the rear glass wall or rear window, illustrated in Fig. 1, (luggage compartment 11), and Figs. 8, 9 and 10.

As it is clear from the drawing, applicant suspends from the body rear deck 55 a unit composed of the described air collector 16, blower fan 17 in housing 18 and motor 19, to force outside air in contact with the rear window. An air duct 56 conducts the air from the luggage compartment through deck 55 to an opening in front of the usual transverse rear window structure 56', where the air is laterally deflected by insert 56". In between housing 18 and deck 55, duct 56 is provided with a heating element 36 on support 27, the support and element is an exact duplicate heretofore described in connection with Figs. 1 to 4, inclusive. Here, however, applicant proposes a wiring diagram shown in Fig. 10, wherein, when blower fan motor switch 38 is turned on, both fan motors 19 start to operate, and similarly, when the thermoelement 40 is set, both heating elements 36 start their heating actions, the heating process automatically terminates at a predeterminate temperature, by the control action of the thermoelement described in connection with Fig. 6.

Fig. 11 illustrates a modification of the invention. Here applicant only illustrates a preferred form, where an air blowing and heating unit is disposed in the luggage compartment 11 besides the described collector 16, blower fan 17 in housing 18, and blower motor 19, also incorporates described engine heated radiator 13. As it is clear from the drawings, hot water pipe 14 is provided with a rear radiator hot water circulating pipe 57, and to water outlet pipe 15 a rear radiator outlet pipe 58 is connected. This rear heating and air circulating unit is provided with an outside air inlet duct 12', and Y 21, described in connection with Figs. 1 to 4. The Y branch 22' guides the outside air to a cross duct 60 having an air outlet opening 61, arranged to serve as a rear window defroster when the thermoelement in Y 21 is energized, or when the engine is sufficiently heated to circulate hot water through radiator 13, and without any heat, serves as dew remover and glass drier.

Branch 23' supplies the outside air, preferably, when electrical or hot water heated to a crosswise duct 62 leading to an opening slot or orifice 63 disposed in between the top of the rear window structure 56' and usual body roof structure 64. For wiring, the diagram shown in Fig. 10 is applicable. When it is desired to defrost the windshield and rear window while the automobile is unattended, the wiring diagram shown in Fig. 7 facilely can be modified to incorporate a doubling effect of the wiring shown in Fig. 10, here for simplicity of presentation now shown.

Applicant here presents a rear window defrosting and drying method without the necessity of any new major parts, an essential, for early adoption, cost reduction, and quick serviceability. Blowing defrosting and drying air along the outer surface of a rear window is a simple and inexpensive installation as related to the values received. The rear window defrosting from the lower inside wall and upper outside wall reduces the blind driving danger. Blowing defrosting and drying air along the exterior surface of a rear window, allowing the formation of a substantially surface protecting moving boundary layer, is believed to be new with the applicant. This has many advantages, the air flow removes lingering rain drops, the layer formation substantially prevents snow or ice deposits on the window exterior surface. When the air is heated, the flowing air quickly melts away snow or ice formations that accumulate when the vehicle is not in use, and particularly when the instantly acting electric heating element is applied, before the engine had time to heat up, thereby driving hazard through lack of visibility is eliminated.

In Fig. 12 applicant illustrates a modification wherein duct 23" guides the air into the inside of the rear door structure for rear door glass wall or window dew and ice removal, when so desired. To force air into a door structure for this purpose is not new per se, a front door structure having an internal air flow is in production on the best automobile now manufactured. Here the air entering the rear door frame structure inside 65 is arranged to escape for dew and frost removal through the normally existing clearance (not shown) at the inside and outside surface of the usual vertically adjustable door glass wall or window pane 66. Rear door glass dew removal by a blower disposed in the luggage compartment needs but short duct connections.

When it is desired to remove the rear window dew by an escaping air stream, is illustrated in Fig. 13. When an opening 67 in deck 55 is connected to a cross duct 68, and to diagonally disposed escape tube 70 (only one is shown) having a terminal 71 with an air stream operated rubber valve 72 thereon. When the automobile is moving, valve 72 opened the rearwardly directed opening in terminal 71, causes a low pressure in duct 68, the accelerated air flow passing through opening 67 removes the dew from the rear window. While the automobile is at stand still, rubber valve 72 closes the outlet opening, to retain the heat in the body of the automobile.

For certain application the escaping air flow is manually controlled (not shown), and in a modification duct 68 and tubes 70 are eliminated and the escaping rear windshield dew removing air passes directly into the luggage compartment (not shown).

The subject matter associated with Fig. 13 will be presented in a divisional application, now U. S. Patent No. 2,670,671, issued March 2, 1954.

Applicant believes that the subject matter presented in this application is of genuine public benefit, he carefully constructed and arranged his invention to use units and other essentials, now available. Dew deposit on the rear window does occur any time and any place at the changing of weather conditions. Frost, ice and snow deposit occurs for many months of the year, particularly in the northern districts and in Alaskan service. The heating of the passenger compartment from the driver's end and also from the rear end of the body, hastens the "comfort stage," and more particularly when the electric resistance heating is used, with its instant response to serve, long before the engine reaches the air heating value.

While I have herein shown and described only certain specific embodiments of my invention and have suggested only certain possible modifications, it will be appreciated that many changes and variations can be made to suit particular conditions and embodiments of use, without departing from the spirit and scope of my invention.

What is claimed is:

1. In a motor vehicle in combination a roof and a transversely disposed rear window, a rear portion of said roof being outwardly spaced from and overlapping an upper portion of said window thereby defining an orifice between said roof and said window, and means for blowing defrosting and drying air outwardly through said orifice along the exterior surface of said window.

2. In a motor vehicle in combination a roof and a transversely disposed rear window, a rear portion of said roof being outwardly spaced from and overlapping an upper portion of said window thereby defining an orifice between said roof and said window, means for blowing defrosting and drying air outwardly through said orifice along the exterior surface of said window, and means for blowing air upwardly along the interior surface of said window.

3. In a motor vehicle in combination a roof and a transversely disposed rear window, a rear portion of said roof being outwardly spaced from and substantially overlapping an upper portion of said window thereby defining an orifice between said roof and said window, means for blowing defrosting and drying air outwardly through said orifice along the exterior surface of said window, and means for supplying heat to said air.

4. In a motor vehicle in combination a roof and a transversely disposed rear window, a rear portion of said roof being outwardly spaced from and substantially overlapping an upper portion of said window thereby defining an orifice between said roof and said window, means for blowing defrosting and drying air outwardly through said orifice along the exterior surface of said window, means for blowing air upwardly along the interior surface of said window, and means for supplying heat to said air.

5. In a motor vehicle in combination a downwardly rearwardly inclined rear window, a roof terminating rearwardly in a downwardly inclined portion spaced outwardly from and substantially overlapping an upper portion of said rear window thereby defining an inclined orifice between said roof and said window, and means for blowing defrosting and drying air through said orifice along the exterior surface of said window.

6. In a motor vehicle in combination a downwardly rearwardly inclined rear window, a roof terminating rearwardly in a downwardly inclined portion spaced outwardly from and substantially overlapping an upper portion of said rear window thereby defining an inclined orifice between said roof and said window, means for blowing defrosting and drying air through said orifice along the exterior of said window, and means for blowing air upwardly along the interior surface of said window.

7. In a motor vehicle in combination a downwardly rearwardly inclined rear window, a roof terminating rearwardly in a downwardly inclined portion spaced outwardly from and substantially overlapping an upper portion of said rear window thereby defining an inclined orifice between said roof and said window, means for blowing defrosting and drying air through said orifice along the exterior surface of said window, and means for supplying heat to said air.

8. In a motor vehicle in combination a downwardly rearwardly inclined rear window, a roof terminating rearwardly in a downwardly inclined portion spaced outwardly from and substantially overlapping an upper portion of said rear window thereby defining an inclined orifice between said roof and said window, means for blowing defrosting and drying air through said orifice along the exterior surface of said window, means for blowing air upwardly along the interior surface of said window, and means for supplying heat to said air.

9. In a motor vehicle a body having a roof structure and a transversely disposed rear window structure, a rear window exterior surface defroster and dryer comprising, a rearwardly extending orifice disposed in between said structures and means for supplying defrosting and drying air to said orifice from said body.

10. The invention disclosed in claim 9, wherein the defrosting and drying air is heated.

References Cited in the file of this patent
UNITED STATES PATENTS

| | | |
|---|---|---|
| 1,465,292 | Wessig | Aug. 21, 1923 |
| 2,150,110 | Strauss et al. | Mar. 7, 1939 |
| 2,180,760 | Mayo | Nov. 21, 1939 |
| 2,258,922 | Albee | Oct. 14, 1941 |
| 2,492,506 | Stinnett | Dec. 27, 1949 |